Patented Aug. 11, 1953

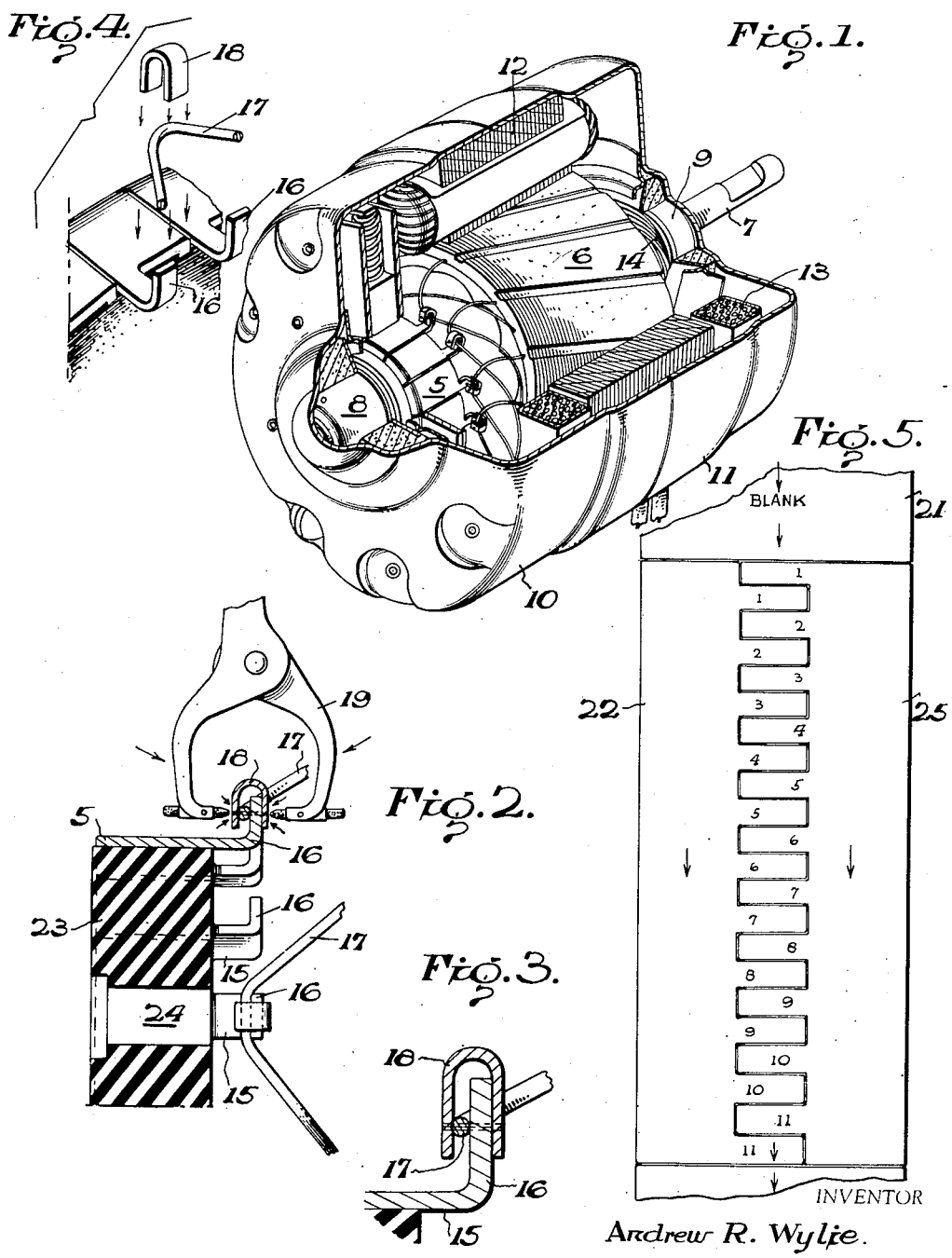

2,648,792

UNITED STATES PATENT OFFICE 2,648,792

DYNAMOELECTRIC MACHINE

Andrew R. Wylie, Owosso, Mich., assignor to Redmond Company, Inc., Owosso, Mich., a corporation of Michigan Application November 21, 1950, Serial No. 196,811

6 Claims. (Cl. 310—234)

This invention relates to dynamo-electric machines, and particularly to machines having armature assemblies including commutators to which the armature windings connect, for transfer of current therebetween.

An object of the invention is to provide a new method of permanently connecting armature coils to the individual commutator segments in circuit therewith.

A second object is to provide a novel commutator terminal assembly for the maintenance of electrical continuity between individual armature windings and the commutator segments associated therewith.

Other objects and features of the invention are exhibited in its component factors as revealed in the following specification describing the embodiment illustrated in the accompanying drawings, which embodiment is exemplary only, and not definitive of the invention's limits, but only of its principles.

In the drawings:

Fig. 1 is a perspective view of an electric motor of fractional horse-power capacity;

Fig. 2 is a sectional view of part of the commutator of the motor of Fig. 1, and showing also the novel method of connecting an armature wire thereto;

Fig. 3 is an enlarged sectional view of one of the commutator segment terminals;

Fig. 4 is an exploded perspective view illustrating successive steps; and

Fig. 5 is a view of a copper sheet, or strip, showing a method of punching out commutator blanks for formation of commutators such as the one illustrated in Figs. 1 and 2.

As shown in the drawings the motor includes a commutator 5 and an assembly of laminations constituting an armature 6 secured to a shaft 7 supported in bearings 8 and 9 mounted in the end walls of a two-part housing 10, 11 surrounding the laminated field structure 12 within which the armature 6 rotates in response to the delivery of current to the field windings 13 and the armature windings 14. Armature coils 14 are formed by looping a pre-determined number of turns of insulated wire in the successive slots of the armature 6, with at least one loop of each coil being extended considerably beyond the slot ends, in order to pass behind, and be retained by, the upstanding end 16 of one of the tabs 15 projecting from the respective commutator segments. After all coils have been formed, each with a loop 17 caught behind the corresponding tab end 16, the loops are permanently secured by the application of clamping staples 18 (see Figs. 2, 3, and 4) to the individual loops, at their respective points of engagement with their tabs, and by welding each staple, in sequence, to its respective loop and tab. Fig. 2 shows a welding tool 19 with its electrodes applied to opposite legs of a staple 18, to weld the parts 16 and 17 to the staple, and to each other. The welding heat is sufficient to burn away all insulating material on the affected segment of the loop 17, hence it is not necessary to perform a separate insulation removing operation, such as has heretofore been required.

The commutator 5 may originally be formed by stamping out of a copper sheet 21 (Fig. 5) a piece 22 of such a size and shape that, when rolled and seamed, it will have the appearance indicated in Figs. 1 and 2. The core 23 is thereafter molded thereto, and a central opening 24 is provided to receive the armature shaft 7. The individual commutator segments may be formed by sawing through the copper band 5 at the proper points, as is the usual practice. When punching out the piece 22 from the strip 21, a complementary piece 25 may be punched out simultaneously, in the form indicated in Fig. 5.

What I claim is:

1. The method of connecting an armature coil of a dynamo-electric machine to a commutator segment of such a machine which comprises the steps of looping an insulated wire section of said coil onto an end portion of said commutator segment, and welding said looped wire section to said end portion by the application of sufficient heat to effect the weld and at the same time burn away the insulation on said wire section at said weld.

2. In the method of claim 1, the additional step of applying a clamping element to clamp the looped wire section and said commutator segment end portion for performance of the welding operation.

3. The method of claim 2, in which the welding operation is applied to the opposite legs of the clamping element, said wire section and said end portion being thereby welded to each other and to the opposite legs of the clamping element.

4. In a dynamo-electric machine a rotatable assembly including a commutator having a series of segments insulated one from the other, each of said segments having an end portion, an armature having about its periphery a series of slots corresponding in number to the number of said commutator segments, a coil of insulated wire positioned in each of said armature slots, with one insulated wire section of each coil looped about one of said commutator segment end portions, the said insulated wire section and said commutator segment end portion being welded together with the insulation on said wire section being burnt away by said weld in the region of said weld.

5. The rotatable assembly in a dynamo-electric machine of claim 4 in which a clamping element clamps and is welded to the looped wire section and said commutator segment end portion.

6. The rotatable assembly in the dynamo-electric machine of claim 4 in which a U-shaped clamping element clamps the looped wire section and said commutator segment end portion, the wire section and said end portion being welded to each other and to the opposite legs of the clamping element.

ANDREW R. WYLIE.

References Cited in the file of this patent

UNITED STATES PATENTS

| Number | Name | Date |
|---|---|---|
| 261,288 | Wood | July 18, 1882 |
| 1,464,184 | Mansbendel | Aug. 7, 1923 |
| 1,525,967 | Vogel | Feb. 10, 1925 |
| 1,536,328 | Caruso | May 5, 1925 |
| 1,782,447 | Scrantom | Nov. 25, 1930 |
| 2,258,189 | Meisner | Oct. 7, 1941 |
| 2,455,560 | Cobb | Dec. 7, 1948 |
| 2,479,556 | Chanowitz | June 27, 1949 |
| 2,527,479 | Hall | Oct. 24, 1950 |
| 2,572,956 | Servis | Oct. 30, 1951 |

FOREIGN PATENTS

| Number | Country | Date |
|---|---|---|
| 23,738 | Great Britain | of 1905 |

OTHER REFERENCES

Product Engineering, October 1946, page 104.